United States Patent [19]

Grantham-Hill

[11] Patent Number: 4,608,602
[45] Date of Patent: Aug. 26, 1986

[54] CIRCUIT FOR GENERATING A CONTROL SIGNAL FOR THE FIELD DEFLECTION IN A PICTURE DISPLAY DEVICE

[75] Inventor: Timothy R. Grantham-Hill, Breda, Netherlands

[73] Assignee: U.S. Philips Corporation, New York, N.Y.

[21] Appl. No.: 649,093

[22] Filed: Sep. 10, 1984

[30] Foreign Application Priority Data

Sep. 30, 1983 [NL] Netherlands ............. 8303347

[51] Int. Cl.⁴ .................. H04N 5/04; H04N 5/10
[52] U.S. Cl. ............................. 358/148; 358/152; 358/154
[58] Field of Search ............... 358/148, 150, 151, 152, 358/154, 158, 92, 188

[56] References Cited

U.S. PATENT DOCUMENTS 3,382,320  5/1968  Baldwin et al. ............. 358/152
4,408,197  10/1983  Komatsu et al. ............. 340/720

Primary Examiner—James J. Groody
Assistant Examiner—Michael D. Parker
Attorney, Agent, or Firm—Thomas A. Briody; William J. Streeter; Edward W. Goodman

[57] ABSTRACT

A circuit for generating a control signal for the field deflection in a picture display device which is suitable for displaying an interlaced picture. The circuit comprises a field identification circuit, with the aid of which a distinction can be made between the two fields which form a picture, and a signal selection circuit for setting the sequence of occurrence of a first field signal which corresponds to a first field, and a second field signal which corresponds to a subsequent second field. The circuit enables a choice between a picture with or without interlace, it further being optionally possible to eliminate the interlace by shifting a field upwards or downwards relative to the other field.

5 Claims, 2 Drawing Figures

CIRCUIT FOR GENERATING A CONTROL SIGNAL FOR THE FIELD DEFLECTION IN A PICTURE DISPLAY DEVICE

BACKGROUND OF THE INVENTION

The invention relates to a circuit for generating a control signal for the field deflection in a picture display device, comprising a source of incoming synchronizing signals intended for the display of an interlaced picture, and a field identification circuit connected to the synchronizing signal source for producing a first field signal on receipt of a first field and a second field signal on receipt of a subsequent, second field, the second field signal deviating from the first field signal, the first and second field signals forming the control signal and the circuit further comprising an address generator for controlling the transfer of the control signal for the field deflection.

Such a circuit is disclosed in European patent application No. 81.627. In order to reduce an annoying jitter phenomenon on display of a digitally generated picture and/or text information signal, the interlace is eliminated with the aid of this prior art circuit because one field is written on the display screen superimposed on the other field. To that end the circuit comprises a field identification circuit with the aid of which a distinction can be made between the two fields which together form a picture.

It has, however, been found that in certain circumstances, instead of being reduced by the elimination of the interlace, the jitter of the displayed picture is actually increased.

SUMMARY OF THE INVENTION

The invention has for its object to provide a circuit which does not have this disadvantage and, therefore, the circuit according to the invention is characterized in that the circuit also comprises a signal selection circuit which is connected to the field identification circuit and controlled by the address generator, for setting the sequence in which the first and second field signals occur.

The invention is based on the recognition that in all circumstances, the jitter is substantially eliminated if the field which is shifted relative to the other field is chosen in the proper way. Namely, it depends on the coding of the picture and consequently of the picture source whether one field must be shifted upwards or downwards on the display screen. This source, for example a computer system, is not known in advance. For this purpose, the invention provides a setting feature which is not available in the prior art circuit.

In an embodiment, the circuit is characterized in that the signal selection circuit comprises a sequence circuit having a first input for receiving the first field signal, a second input for receiving the second field signal, a selection input for receiving a signal coming from the address generator, and an output for conveying the output signal of the sequence circuit for the field deflection.

The circuit may advantageously be characterized in that the first field signal is a signal of the field frequency, whose phase is substantially fixed relative to the incoming synchronizing signal, while the second field signal is also a signal of the field frequency which is delayed by half a line period relative to the first field signal, the signal coming from the address generator being formed by two address signals, the first field signal being conveyed at the occurrence of a first address signal, whereas the second field signal is conveyed at the occurrence of a second address signal, the sequence of occurrence of the first and second address signals being optionally adjustable.

A circuit in which the address generator is a bistable element to which a signal of the field frequency is applied, may advantageously be characterized in that the signal selection circuit comprises a first change-over switch for optionally applying a signal of the field frequency to a setting or a resetting input, respectively, of the bistable element whose output signals have the picture frequency and are the first and second address signals.

Preferably, the circuit is characterized in that the signal selection circuit comprises a second change-over switch for conveying the first field signal or the output signal of the sequence circuit, respectively, for the field deflection. Thanks to this measure, it is not only possible to make a choice between the two modes of eliminating the interlace, but a choice can also be made between interlace or non-interlace.

DESCRIPTION OF THE DRAWING

The invention will now be further described by way of example with reference to the accompanying drawing, in which.

DESCRIPTION OF THE PREFERRED EMBODIMENT

Figure 1:
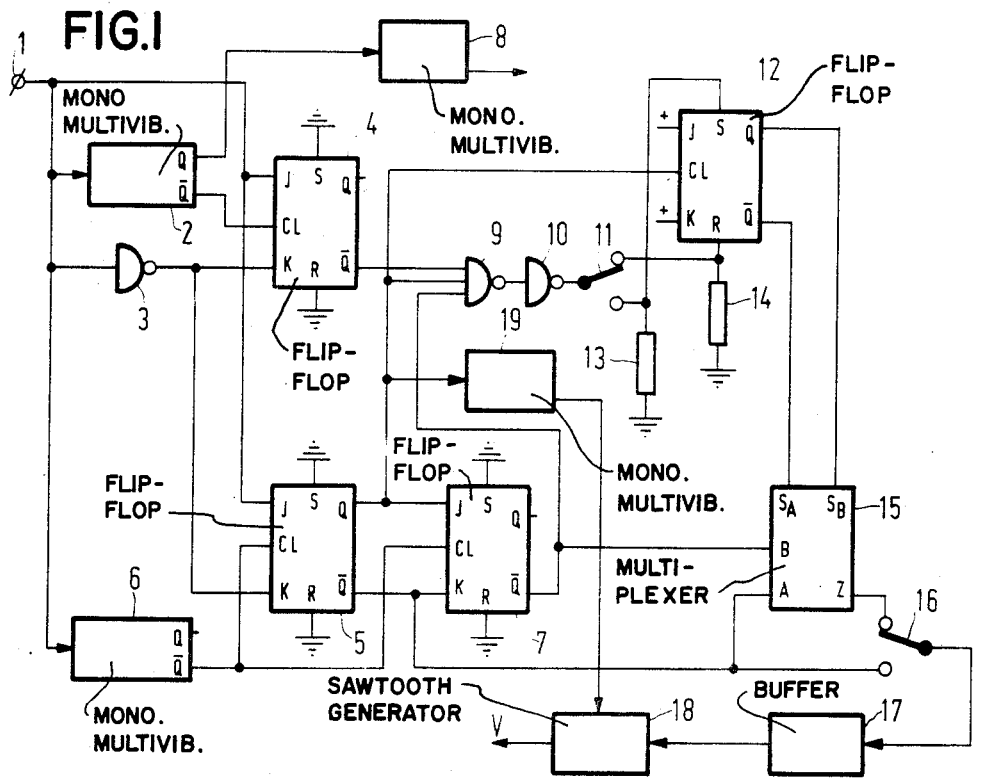
FIG. 1 shows the circuit diagram of an embodiment of the circuit according to the invention, which circuit forms part of a picture display device, for example, a monitor or a television receiver.

In FIG. 1, reference numeral 1 denotes the input terminal of the circuit. A composite synchronizing signal is present at terminal 1, which signal is derived from an incoming video signal in a synchronizing-separating stage, not shown. The signal on terminal 1 corresponds, for example, to the European television standard. It comprises line synchronizing, equalizing and field synchronizing pulses which have a duration and occur with a time difference as prescribed in the standard. The signal is shown in FIG. 2a at the end of a field and at the beginning of the subsequent field, more specifically for the lines 310 to 320, inclusive, of the picture to be displayed. The synchronizing signal in accordance with other television standards, differs in some details from the signal shown in FIG. 2a, but is not important to the invention.

If the vertical deflection in the picture display device, of which the circuit of FIG. 1 forms part, is in synchronism with the incoming signal on terminal 1, then each field of the picture displayed on the display screen starts at an instant which is fixed relative to the leading edge of the first field synchronizing pulse. The circuit is of such a structure that a choice can be made from three possibilities. The first possibility is that the leading edge occurs one field period, i.e. $312\frac{1}{2}$ line periods, after the corresponding leading edge of the preceding field, which results in an interlaced picture. A line of a given field, for example line 7, is then displayed between two lines of the subsequent field, in this example lines 319 and 320. The second possibility is to shift a field forward in the time by half a line period relative to the preceding field, resulting in a line of a field coinciding with the line of the subsequent field whose serial number differs by 313, for example line 7 coincides with line 320. The third possibility provides that a field is shifted backwards in the time by half a line period relative to the preceding field, so that line 7 coincides with line 319.

The signal at terminal 1 is applied to a non-retriggerable monostable multivibrator 2, to an inverter stage 3, to the J-input of a first flip-flop 4, to the J-input of a second flip-flop 5 and to a monostable multivibrator 6. The output of stage 3 is connected to the K-input of flip-flop 4 and to the K-input of flip-flop 5. Multivibrator 2 has a time constant which is greater than 32 μs and less than 64 μs, for example, 42 μs. The signal at the $\bar{Q}$-output of multivibrator 2 is shown in FIG. 2b, and is applied as a clock signal to flip-flop 4. Multivibrator 6 has a time constant of approximately 16 μs. The signal at the $\bar{Q}$-output thereof is shown in FIG. 2c, and is applied as a clock signal to flip-flop 5 and to a third flip-flop 7. The Q-output of flip-flop 5 is connected to the J-input of flip-flop 7 and the $\bar{Q}$-output of flip-flop 5 is connected to the K-input of flip-flop 7. The setting and the resetting inputs of flip-flops 4, 5 and 7 are connected to ground. The signal at the Q-output of multivibrator 2 is applied to a retriggerable multivibrator 8, which has a time constant of approximately 4.8 μs. The signal at the $\bar{Q}$-output of flip-flop 4 is shown in FIG. 2d; it is applied to a NAND-gate 9 to which also the signal at the Q-output of flip-flop 5 (FIG. 2e) and also the signal at the Q-output of flip-flop 7 (FIG. 2f) are applied.

The signal shown in FIG. 2b comprises pulses which occur with the same repetition rate as the line synchronizing pulses. Consequently, the output signal of multivibrator 8 is a regenerated line synchronizing signal which is applied to a line synchronizing circuit, not shown, for generating in known manner a local signal of the line frequency for the horizontal deflection in the picture display tube. The signal shown in FIG. 2c comprises pulses whose negatively-going edges coincide with the leading edges of the pulses shown in FIG. 2a. So the pulses shown in FIG. 2c indicate the position of the line synchronizing pulses, the equalizing pulses, as well as the field serration pulses, and in the interval in which the equalizing and the field serration pulses occur, the pulses shown in FIG. 2c have double the line frequency. In these circumstances, the signal shown in FIG. 2d is high until the instant at which the first positively-going edge of the clock signal of FIG. 2b occurs after the beginning of the field synchronizing interval, at which instant, the signal shown in FIG. 2d becomes low. The subsequent transition from low to high coincides with the first positively-going edge of the clock signal after the end of the field synchronizing interval. In similar manner, the signal shown in FIG. 2e has, during the field synchronizing interval, a transition at the occurrence of the first positively-going edge of the clock signal of FIG. 2c after the beginning and the end, respectively, of the field synchronizing interval.

Figure 2:
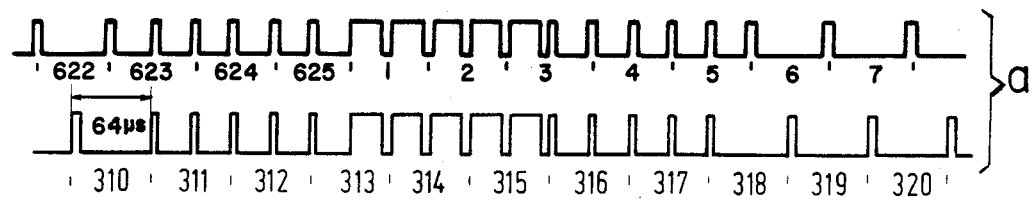
FIG. 2 shows waveforms occurring in the circuit shown in FIG. 1.
Figure 2:
Figure 2:
Figure 2:
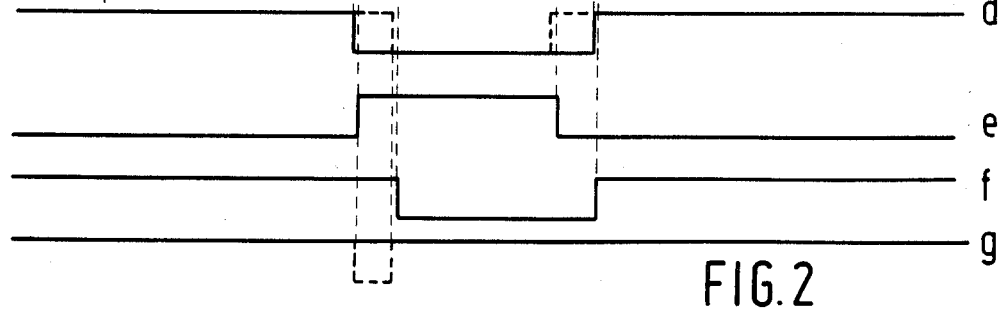

After a transition in the input signals for flip-flop 7, the signal of FIG. 2f at the output of the flip-flop 7 is submitted to a transition at the occurrence of the subsequent positively-going edge of the clock signal shown in FIG. 2c. Compared with FIG. 2e, the signal of FIG. 2f is consequently shifted by 32 μs, more specifically, twice the delay produced by multivibrator 6, while the leading edge of the signal of FIG. 2e itself is shifted by 16 μs relative to the leading edge of the first field synchronizing pulse in FIG. 2a, more specifically, because of multivibrator 6. The foregoing shows that flip-flops 5 and 7 form a shift register. The diagrams of FIG. 2 show that the three input signals of gate 9 are not simultaneously in the high state, with the result that the output signal of the gate is high.

The above description and the corresponding diagrams of FIG. 2 apply to the input signal shown in FIG. 2a. One field period later lines 622 to 625, inclusive, and 1 to 7, inclusive, occur. If the leading edge of the first field serration pulse in the center of line 313 corresponds to the leading edge of the first field serration pulse between lines 625 and 1, then a line synchronizing pulse of one field corresponds to the center of a line period of the other field. Thus, the line pulse, for example, located between lines 6 and 7, is the center of line 319. A whole line, namely line 310, is located between the last line pulse of one field and the subsequent first pre-equalizing pulse, whereas the first half of line 623 is located between the last line synchronizing pulse of the following field and the subsequent first pre-equalizing pulse. In the field synchronizing interval, the positively-going leading edge of the first clock pulse of flip-flop 4 is produced before the end of line 313, so prior to the first field serration pulse, or before the end of line 1, respectively, so prior to the second field serration pulse. At the end of this interval, a similar leading edge is produced before the end of line 316, so prior to the third post-equalizing pulse, or before the end of line 3, so prior to the second post-equalizing pulse, respectively. From the foregoing, it will be obvious that the first transition of the signal at the output of flip-flop 4 corresponds, one field period after the signal of FIG. 2a, to an instant which is located 32 μs, i.e. half a line period, later than the first transition in FIG. 2d, and that the second transition of the signal at the output of flip-flop 4 corresponds, one field period after the signal shown in FIG. 2a, to an instant which is located 82 μs before the second transition in FIG. 2d. This is shown in FIG. 2d by means of broken lines.

As the clock pulses of flip-flops 5 and 7 have double the line frequency during the equalizing and field-synchronizing interval, the edges of the pulses at the outputs of these flip-flops are not shifted relative to the corresponding edges in the preceding field. FIG. 2 shows that the output signal of gate 9, which is shown in FIG. 2g and is in the high state in the case of the signal shown in FIG. 2a, has a pulse one field period later, more specifically during a portion of line 1. This pulse is shown in FIG. 2g by means of broken lines, and is repeated at the picture frequency, i.e. 25 Hz, and is representative of the field whose first line starts with the leading edge of the first field synchronizing pulse. In the event of an incoming synchronizing signal in accordance with the United States standard, it is found that a similar pulse of the picture frequency, here with a frequency of 30 Hz, is generated.

The output signal of gate 9 is applied to the master contact of a change-over switch 11 via an inverter stage 10. The setting input S of a flip-flop 12 is connected to a first selection contact of change-over switch 11 and to a resistor 13 having a value of approximately 22 kΩ, while the resetting input R of flip-flop 12 is connected to a second selection contact of change-over switch 11 and to a resistor 14, which also has a value of approximately 22 kΩ. The other ends of resistors 13 and 14 are connected to ground. The Q-output of flip-flop 5 is connected to the clock input CL of flip-flop 12. The $\overline{Q}$-output of flip-flop 5 is connected to a first input A of a multiplexer 15, whereas the $\overline{Q}$-output of flip-flop 7 is connected to a second input B of multiplexer 15. The J-input and the K-input of flip-flop 12 carry a logic 1. The $\overline{Q}$-output of flip-flop 12 is connected to a first selection input $S_A$ of multiplexer 15, whereas the Q-output of flip-flop 12 is connected to a second selection input $S_B$ of multiplexer 15. Multiplexer 15 is a circuit for conveying the input signals thereof in a predetermined sequence. If the signal at the input $S_A$ is high, then the signal from input A is conveyed, whereas the signal from input B is conveyed if the signal at input $S_B$ is high.

Flip-flop 12 is used as an address generator for multiplexer 15. If the master contact of switch 11 is connected to the second selection contact, then flip-flop 12 is reset by the first field identification pulse supplied by gate 9 and stage 10. The Q-output of flip-flop 12 is then in the low state while the $\overline{Q}$-output is in the high state. So, during the field which starts with line 1, multiplexer 15 transmits the signal at input A, that is to say, the signal shown in FIG. 2e is present at the output Z of the multiplexer with the inverted polarity: it is the non-delayed field, control pulse. During the subsequent field no field identification pulse is generated. Flip-flop 12 changes state at the occurrence of the leading edge of the signal shown in FIG. 2e, in response to which input $S_B$ is now adjusted to the high state. The delayed field control pulse shown in FIG. 2f is now present at output Z. Output Z is connected to a first selection contact of a change-over switch 16, the master contact of which is connected to a buffer stage 17. Stage 17 transfers the control signal to a sawtooth generator 18 of a known type. Generator 18 generates a sawtooth-shaped signal which is suitable for application to a field deflection circuit for the vertical deflection in the picture display tube. In the absence of the control signal, generator 18 oscillates at its natural frequency. If the described control signal is indeed present, generator 18 does not oscillate freely: the sawtooth waveform generated thereby is initiated or terminated, respectively, at an instant determined by the control signal. In the case under consideration, the field which starts halfway along line 313 begins with a delay of half a line period whereas the next field is not delayed. So line 1 coincides with line 313.

If in contrast therewith, the master contact of switch 11 is connected to the first selection contact, then flip-flop 12 is set by the next field identification pulse of FIG. 2g. In this case, the phase of the output signals of flip-flop 12 is inverted relative to the above-described case, causing the sequence of the signals at the output of multiplexer 15 also to be inverted. This has the effect that the control signal for generator 18 begins during the field which starts with line 1, with a delay of half a line period and is not delayed during the subsequent field. So line 1 coincides with line 312. If switch 16 is in the position shown, then the interlace is eliminated in the displayed picture, it being possible to make the choice for the direction of pairing with the aid of change-over switch 11. A second selection contact of change-over switch 16 is connected to the Q-output of flip-flop 5. If the master contact of change-over switch 16 is connected to this second selection contact, then the signal shown in FIG. 2e is applied with the inverted polarity to stage 17 as a control signal. So the field deflection is always initiated without delay, so that the picture displayed on the display screen is an interlaced picture. So the change-over switch 16 makes it possible to choose between elimination or not of the interlace.

Switches 11 and 16 may be in the form of manually operated, mechanical switches for the relevant setting. It will be obvious that they may be of any other desired construction, they may, for example, be in the form of electrical circuits. In their most simple form, each switch is formed by a piece of electric wire which can be provided in the adequate position in the circuit.

The circuit shown in FIG. 1 also comprises a retriggerable monostable multivibrator 19 to which the signal shown in FIG. 2e, which is received from the Q-output of multivibrator 5, is applied. The time constant of multivibrator 19 has a value between the field period of 16.7 ms in accordance with the United States standard (60 Hz) and the 20 ms field period in accordance with the European standard (50 Hz). Multivibrator 19 generates a signal of the field frequency which is applied to sawtooth generator 18 as an identification signal for the field frequency. Generator 18 is arranged in such a known way that the sawtooth-shaped signal generated by it has substantially the same amplitude for 60 Hz as for 50 Hz.

The above-described circuit is implemented with the aid of digital switching elements and is consequently particularly compact and reliable. The following elements of the Philips type are used:

multivibrators 2 and 8: HEF 4528
multivibrators 6 and 19: HEF 4528
flip-flops 4 and 5: HEF 4027
flip-flops 7 and 12: HEF 4027
gates 3, 9 and 10: HEF 4023
multiplexer 15: HEF 4019

It will be obvious to a person skilled in the art that all the elements of the circuits may be replaced by other elements having similar functions. Thus it is, for example, possible to replace the different monostable multivibrators whose time constant must be set by means of RC-networks of counters which count a number of clock pulses. Alternatively, elements 12 and 15 can be of such a construction that multiplexer 15 can be controlled by only one address signal. It will also be obvious that the described elements may form part of an integrated circuit for the field synchronization, optionally in combination with a frequency-dividing circuit by means of which the line frequency is divided so as to obtain the field frequency. Finally, the circuit is suitable for use in any type of picture display device, monitor or television receiver. In the case of a television receiver it may be desirable, when a teletext signal is displayed, to eliminate the interlace.

What is claimed is:

1. A circuit for generating a control signal for field deflection in a picture display device, comprising an input for receiving a composite synchronizing signal intended for controlling the display of an interlaced picture, a field identification circuit connected to the synchronizing signal input for producing a first field signal on receipt of a first field and a second field signal on receipt of a subsequent second field, the second field signal deviating from the first field signal, and an address generator coupled to the field identification circuit for generating signals for controlling the transfer of the control signal, formed by said first and second field signals, for the field deflection, characterized in that the circuit further comprises a signal selection circuit coupled to the field identification circuit and the address generator for receiving said first and second field signals and for setting the sequence in which the first and second field signals occur in said control signal appearing at an output thereof.

2. A circuit as claimed in claim 1, characterized in that the signal selection circuit comprises a sequence circuit having a first input for receiving the first field signal, a second input for receiving the second field signal, a selection input for receiving the signals from the address generator, and an output for conveying the control signal for the field deflection.

3. A circuit as claimed in claim 2, characterized in that the first field signal is a signal of the field frequency, whose phase is substantially fixed relative to the incoming synchronizing signal, while the second field signal is also a signal of the field frequency which is delayed by half a line period relative to the first field signal, the signals from the address generator being formed by two address signals, the first field signal being conveyed at the occurrence of a first of said address signals, whereas the second field signal is conveyed at the occurrence of a second of said address signals, the sequence of occurrence of the first and second address signals being adjustable.

4. A circuit as claimed in claim 3, the address generator being a bistable element to which a signal of the field frequency is applied as a clock signal, characterized in that the signal selection circuit further comprises a first change-over switch for alternatively applying a signal of the picture frequency, derived from said first and second field signals, to a setting or a resetting input, respectively, of the bistable element whose output signals have the picture frequency and are the first and second address signals.

5. A circuit as claimed in claim 3, characterized in that the signal selection circuit further comprises a second change-over switch for alternatively conveying the first field signal or the output signal of the sequence circuit, respectively, as the control signal for the field deflection.

* * * * *